United States Patent

Urs

[11] 4,304,706
[45] Dec. 8, 1981

[54] METHOD FOR PREPARING A COLOR PIGMENTED MOISTURE CURING POLYURETHANE COATING

[76] Inventor: Bhaskar R. Urs, 3021 Simpson St., Evanston, Ill. 60201

[21] Appl. No.: 87,814

[22] Filed: Oct. 24, 1979

[51] Int. Cl.³ .................................................. C08K 5/10
[52] U.S. Cl. .......................... 260/31.4 R; 260/29.1 R; 260/32.8 N; 260/37 N; 260/40 TN
[58] Field of Search .............. 260/328 N, 37 N, 42.19, 260/42.44, 42.21, 42.29, 42.53, 42.56, 31.2 N, 37 R, 40 TN, 31.4 R, 29.1 R; 106/308 N

[56] References Cited

U.S. PATENT DOCUMENTS

| | | | |
|---|---|---|---|
| 3,917,556 | 11/1975 | Baurecht et al. | 260/49 TN X |
| 4,049,610 | 9/1977 | Bunge et al. | 106/308 N X |
| 4,075,152 | 2/1978 | Taller | 260/37 N |
| 4,129,455 | 12/1978 | Thompson et al. | 106/308 N |
| 4,143,181 | 3/1979 | Cahn et al. | 427/386 X |
| 4,180,491 | 12/1979 | Kim et al. | 260/37 N X |

Primary Examiner—Michael R. Lusignan
Assistant Examiner—Thurman K. Page
Attorney, Agent, or Firm—Irving Faber

[57] ABSTRACT

This invention relates to a new and useful process for color pigmented moisture curing polyurethanes. The process is comprised of preparing a slurry of specified color pigments, solvents, and additives to which is added a specified quantity of a chosen monomeric diisocyanate. A polyol (or other suitable hydrogen donor) is added to the slurry and the monomeric diisocyanate. Pigments are then dispersed in the aforesaid admixture. To the aforesaid admixture, called a color pigment dispersion, isocyanate prepolymers are added. The completed admixture results in a stable colored moisture curing (air drying) polyurethane for use as a protective and decorative coating.

23 Claims, 4 Drawing Figures

METHOD FOR PREPARING A COLOR PIGMENTED MOISTURE CURING POLYURETHANE COATING

BACKGROUND OF INVENTION

There are many commercial and industrial protective and/or decorative coatings for use on walls, machines, and other such entities requiring protective coatings. Polyurethane coatings are known in the industry as one of the toughest coatings available. However, due to certain problems, there is a reluctance to use such coatings.

The industry, for the most part, resorts to a two package system to overcome the problems of combining color pigments and isocyanate polymers to create a moisture curing polyurethane. One of such problems is that the color pigments contain absorbed moisture on their surfaces that cause the polyurethane formula to gel within a few days, becoming hard and unfit for commercial use.

There are many polyisocyanates that react with atmospheric water at room temperatures and form useful films that are used in a limited form as moisture curing polyurethane coatings. This type of coating is one of the finest coatings available that can be produced without the use of heat or other external sources of energy being applied. They are very useful for objects that cannot be heated such as prefabricated metal building, plastics, large machinery, air planes, ships, etc.

In preparing a polyurethane coating using the two package method, a polyol is chosen that will chemically combine with a suitable polyisocyanate. The polyol portion is pigmented to achieve the desired color, opacity, etc. The pigmented polyol portion and the polyisocyanate are supplied in separate containers to the ultimate user or consumer. The consumer mixes the two portions in accordance with the ratio specified by the manufacturer just prior to use. This admixture hs a limited life and must be used up within a relatively short period of time or it will harden and become unusable. This approach is not only cumbersome but expensive in that it results in a quantity of hardened and wasted material if the entire admixture is not used up. There is also a risk in that the pigmented polyol portion and the polyisocyanate portion will not be mixed in the correct ratio causing serious damage to the performance of the resulting polyurethane coating. In addition, atmospheric moisture is a significant factor in using the two package method in that water also cures isocyanates. On a hot, humid day, a large portion of the polyisocyanate is cured by atmospheric moisture leaving a portion of the polyol with nothing to cross link itself with, resulting in a coating less desirable than if the polyol was completely cross linked. Likewise, on a cold, dry day more of the polyol will cross link with the polyisocyanates. It is apparent that the two package polyurethane coating method will produce a quality of coating dependent upon atmospheric conditions said conditions being almost always impossible to control, and if so, very expensive.

Moisture curing polyurethane coatings can be made in a single package method eliminating all the above mentioned problems of the two package types. However, the current methods for making such a single package system is cumbersome and expensive to the consumer. The existing methods for preparing color pigmented polyurethane coatings in a single package requires expensive equipment to dry the color pigments; or, they require the sacrifice of some of the critical properties of the final coating film, such as loss of gloss, high risk of toxicity during application, lack of film strength, etc. Disadvantages of preparing moisture curing color pigmented polyurethane coatings are: use of Molecular Sieves which cause the coatings to lose their gloss and to sometimes gel due to the alkalinity of some of the Molecular Sieves; the use of mono functional isocyanates which is expensive and also hazardous due to their highly volatile nature; the use of Ethyl Ortho Formate to dehydrate the pigments results in the formulation of alcohols which degrade the final coating film; the use of diisocyanates requires an excess which can generate a toxicity problem.

The majority of the moisture curing polyurethanes manufacturers, for the above reasons, manufacture moisture curing polyurethanes in a clear form or pigmented with metallic pigments like aluminum. Metallic pigments contain little or no moisture and hence the moisture problems inherent in color pigments do not exist; the color pigments have enough absorbed moisture in them to render them unfit for use in moisture curing polyurethane coatings.

There is a need for a process of easily, efficiently and inexpensively manufacturing pigmented moisture curing polyurethane coatings on a commercial basis. I am not aware of any means or methods for commercially producing a stable moisture curing polyurethane coating that can be offered for sale in a single package that is efficient and inexpensive, in comparison to existing methods.

SUMMARY OF INVENTION

This invention relates to a new and useful method for efficiently and inexpensively manufacturing a color pigmented moisture curing polyurethane coating. My invention enables one to manufacture a stable pigmented moisture curing polyurethane coating without using expensive equipment for drying the pigments. Also, my invention enables one to manufacture stable pigmented moisture curing polyurethanes using high volume production equipment that are currently accepted and used extensively in the industry. In addition I have been able to commercially manufacture color pigmented moisture curing polyurethanes having a fifty percent lower monomer content than has been heretofore possible.

The reduction of monomers is important because monomeric isocyanates are toxic and cause irritation to the eye as well as being hazardous to the respiratory system. Most monomeric isocyanates have been limited by the American Conference of Governmental Industrial Hygienists to a T.L.V. (threshold limit value) of 0.02 parts per million. The monomeric isocyanates are used to dehydrate the color pigments. However, an excess is required to insure complete dehydration. It is this excess of momomeric isocyanate that remains in the finished polyurethane coating that causes its increased toxicity, exceeding the T.L.V. of 0.02 PPM while being used.

In my present invention the monomer content of the polymeric isocyanate used is reduced significantly by the presence of active hydrogen present in the color pigment dispersion. The reduction of the overall monomer content of the coating substantially reduces the health hazard caused by the toxic monomers.

My invention uses a series of controlled urethane reactions and dispersion in the presence of color pigments to produce a concentrated color pigment dispersion. This color pigment dispersion is then mixed with a isocyanate prepolymer to produce a stable color moisture curing polyurethane that can be stored in a closed container for in excess of one year.

Accordingly, it is an object of this invention to provide a commercial method for efficiently and inexpensively manufacturing a color pigmented moisture curing polyurethane coating.

Another object of my invention is to provide a color pigmented dispersion that will reduce the monomeric isocyanate content of color pigmented moisture curing polyurethanes.

Another object of my invention is to manufacture color pigmented moisture curing polyurethane coating by using conventional high yield paint manufacturing equipment.

A further object of my invention is to provide a color pigment dispersion that will easily convert commercially available isocyanate prepolymers into pigmented moisture curing polyurethanes.

It is a further object of my invention to provide for the manufacture of a color moisture curing polyurethane at the lowest possible viscosities and the corresponding advantages in solids content.

Still a further object of my invention is to produce a color pigmented dispersion for moisture curing polyurethane that have all the additives required for a proper functioning pigmented polyurethane coating.

It is still a further object of my invention to use color pigmented moisture curing polyurethanes in areas where coatings having a higher monomer content could not be used because of the toxic monomers and its resultant health hazard.

IN THE DRAWINGS

DESCRIPTION OF PREFERRED EMBODIMENT

Figure 1:
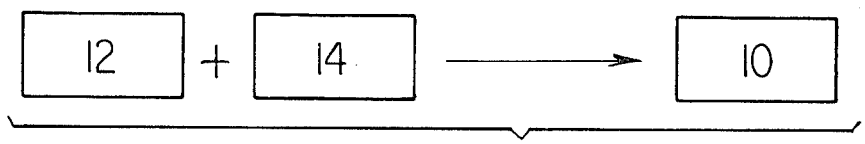
FIG. 1 illustrates, by means of a block diagram, a method for manufacturing my color pigmented moisture curing polyurethane coating.
Figure 2:
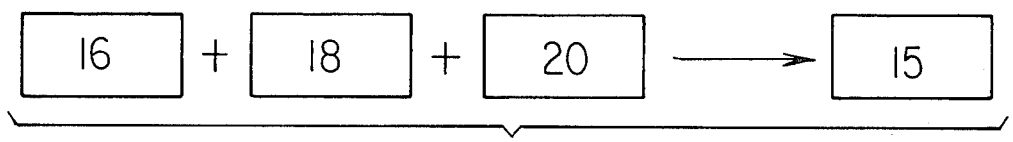
FIG. 2 illustrates, by means of a block diagram, the method for yielding a slurry as embodied by my invention.
Figure 3:
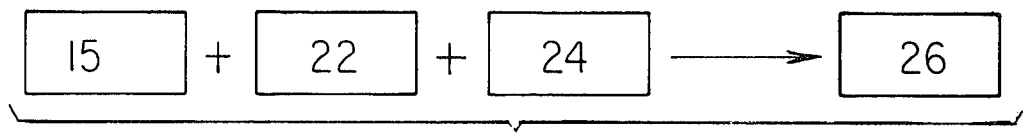
FIG. 3 illustrates, by means of a block diagram, the method for yielding a pigment dispersion paste as embodied by my invention.
Figure 4:
FIG. 4 illustrates, by means of a block diagram, a method for yielding a color pigment dispersion as embodied by my invention.

The preferred embodiment illustrated in FIGS. 1 through 4 and as described herein is not intended to be exhaustive or to limit the invention to the precise form disclosed. It is chosen and described in order to best explain the principles of the invention and its application and practical use to thereby enable others skilled in the art to best utilize the invention.

The process illustrated in the drawings and described hereinafter for making a color pigmented moisture curing polyurethane coating 10 is comprised of a series of controlled urethane reactions in the presence of color pigments producing a concentrated color pigment dispersion 12. The color pigment dispersion 12 is then mixed with an isocyanate prepolymer 14 to produce the stable colored pigmented moisture curing polyurethane coating 10.

The color pigment dispersion 12 comprises in part a slurry 15 of color pigments 16, solvents 18, and additives 20 which are combined in jacketed tanks well known in the art and commonly used in the making of paints and other types of protective coatings. The additives 20 are well known in the art of paint manufacturing and are added to the color pigments 16 and solvents 18 forming the slurry 15. Although the additives are well known in the art special attention must be paid to their compatability and/or reactivity with the isocyanate prepolymer 14 for reasons that will be discussed hereinafter. The color pigments 16 and solvents 18 used in the slurry 15 are well known in the art and are readily available in the market.

The slurry 15 is agitated to form a homogenous mixture after which a small sample is withdrawn to test its moisture content by means of the Karl-Fischer titration test, well known in the art, or by other methods well known in the art. The moisture or water is created by the admixture of the pigments, solvents and additives. The amount of water present in the slurry 15 is calculated from the results of the test sample.

A quantity of monomeric diisocyanate 22 well known for its moisture eliminating qualities is calculated to completely consume the water present in the slurry 15. An additional amount of monomeric diisocyanate 22 is added to the slurry 15. The additional amount depends on the nature of a polyol or hydrogen donor 24 that will be added later in the process. This will be discussed hereinafter. Monomeric diisocyanates are well known in the art and are readily available in the market.

The slurry 15 and the monomeric diisocyanate is continuously agitated at between 50° C. and 70° C. until the waterisocyanate reaction is complete or has reached the desired level; that is, elimination of the water in the slurry 15. When the isocyanate-water reaction is complete an amine titration test, well known in the art, may be used to confirm the amount of monomeric diisocyanate 22 present in the admixture of the slurry 15 and organic monomeric diisocyanate 22.

Many organic diisocyanates may be used in addition to the Isophorone Diisocyanate (IPDI), used in my example set forth hereinafter, such as Trimethyl Hexamethylene Diisocyanate (TMDI) which is excellent for flexible coatings and for exterior use; Toluene Diisocyanate is low priced and exhibits poor exterior characteristics; and, Diphenyl Methane Diisocyanate (MDI) which has poor exterior durability but forms a tough chemical resistant coating.

The organic polyol, or other suitable hydrogen donor 24 is added, to the admixture of the slurry 15 and monomeric diisocyanate 22 forming a color pigment dispersion paste 26, said admixture being agitated until the excess monomeric diisocyanate 22 is consumed by the hydrogen donor 24. Polyols 24 are well known in the art and are readily available in the market place. The following are some of the many examples of organic polyols 24 that can be used:

(a) PCP-0210: A polycaprolactone
(b) Polymeg polyols: Polytetramethylene Ether Glycols
(c) Polypropylene Glycols: Low priced polyethers
(d) Desmophen 1700: A polyester diol
(e) 1,4-Butanediol: a short chain alkylene diol such as used in conjunction with other long chain diols to produce tough and abrasion resistant coatings.
(f) 1,4-Cyclohexane dimethanol (sold by Eastman Kodak, Co.)

(g) Polyamines such as ethylendiamine

The complete consumption of diisocyanates by the hydrogen donor 24 can be confirmed with either an amine titration test or a centrifuged sample scanned on an infrared spectrophotometer well known in the art or by other means well known in the art. A first prepolymer reaction product 28 is formed by the combination of the organic monomeric diisocyanate 22 and the organic polyol 24; said first prepolymer reaction product exhibiting an excess of hydroxyl groups.

At this stage the paste 26 can be dispersed in any of the customary dispersion equipment well known in the art, resulting in the color pigmented dispersion 12. Caution must be exercised to prevent contamination of the dispersion by atmospheric and other sources of moisture from this stage on.

The following is an example of my invention using the aforesaid process for manufacturing a Light Blue Moisture Curing Polyurethane Coating.

EXAMPLE

PART 1.
LIGHT BLUE PIGMENT DISPERSION PASTE FOR MOISTURE CURING POLYURETHANES

| | | Percentage by Weight | |
|---|---|---|---|
| SLURRY | Titanium Dioxide pigment | 40.00% | |
| | Phthalo Cyanide Blue pigment | 1.33% | |
| | Methyl Isobutyl Ketone dispersent - solvent | 21.42% | |
| | Silicone Fluid to improve flow and slip | .13% | |
| | Antiterra-U a non-ionic wetting agent | 1.00% | |
| | A diisocyanate such as Isophorone Diisocyanate (IPDI) | 5.20% | + amount needed for dehydration of $H_2O$ from slurry |
| | A polycaprolactone polyol such as PCP-0210 (Manufactured by UNION CARBIDE) or equivalent | 30.67% | |
| | | 100.00% | |

The above elements are well known in the art and are readily available in the market. The slurry 15 comprising the pigments 16, solvents 18, and additives 20 is formed in a jacketed tank with vent and agitator or other means well known in the art. After the slurry 15 is homogeneous it is tested for its water content using the well known Karl-Fischer titration method. The diisocyanate 22 (IPDI) necessary to remove the water from the slurry 15, as calculated from the results of the Karl-Fischer test, plus the 5.20% excess is added to and agitated with the above slurry 15 to eliminate the water in said slurry. Raising the temperature of slurry to about 60° C. will greatly speed the dehydration process. When the reaction is complete (i.e. dehydration is complete) the admixture may be tested to confirm the dehydration by means of the Karl-Fischer test.

The polyol 24, PCP-0210 as manufactured by Union Carbide Company, is mixed and agitated with the admixture of the slurry 15, and the organic monomeric diisocyanate isophorone diisocyanate (IPDI) until the IPDI is consumed.

The polyol 24 PCP0210 is a polycaprolactone polyol as manufactured by Union Carbide Company. A brochure published by Union Carbide regarding polycaprolactone polyols is attached hereto.

When this last reaction is consummated the light blue color pigment dispersion paste 26 is ready for dispersing and mixing with a second isocyanate prepolymer 14 as set forth in Part 2 of the foregoing example.

Different colors can be obtained by choosing proper pigments and combining them in a similar fashion as set forth in the example with the necessary adjustments, common in the paint industry, being made.

PART 2.
LIGHT BLUE MOISTURE CURING POLYURETHANE

| | Percentage by Weight |
|---|---|
| Dispersion from Part 1 | 40.00% |
| Isocyanate prepolymer such as Desmodur N-75 (MOBAY CHEMICAL CO.) | 28.00% |
| Cellosolve Acetate, a dispersing solvent | 32.00% |
| | 100.00% |

The combination of the Light Blue Pigment Dispersion 12 formulated as set forth in part 1 hereinabove, with the second isocyanate prepolymer 14 Desmodur N-75 and the Cellosolve Acetate results in stable Light Blue moisture curing polyurethane coating 10. Note that cellosolve acetate is a solvent and has been arbitrarily chosen to enable a homogeneous mixture of the dispersion 12 with the second prepolymer 14. Any suitable solvent can be used in its place. The second isocyanate prepolymer 14 combines isocyanate functionality with a polymer backbone. Desmodur N-75, Mondur CB-75, T-1890 and Spenkel P49-75S are some of the many isocyanate prepolymers that may be used.

Desmodur N-75 as manufactured by the Mobay Chemical Corporation of Pittsburgh, PA is generically biuret of hexamethylene diisocyanate. See page 3 of article entitled "Chemistry for Coatings" by Mobay Chemical Corporation.

Thirteen (13) parts by weight of the monomeric isocyanate IPDI, will consume one (1) part by weight of water of the slurry 15. Therefore, based on the amount of water found by means of the Karl-Fischer titration test, the amount of IPDI 22 needed to dehydrate the water in the slurry 15 can be calculated. Note that if any other additives are used that bring with them other materials that react with isocyanates, additional IPDI will have to be used for complete dehydration of the slurry 15.

The 5.2% IPDI set out in part 1 of my example is added along with the amount of IPDI necessary to dehydrate the slurry 15 to ensure the complete dehydration of the slurry. This excess diisocyanate will combine with 30.67% of the polyol 24, PCP-0210, to form a urethane backboned long chain polyol of an equivalent weight of 1300.

The type and amount of the polyol 24 chosen is dictated by the following factors:

(1) The nature of the polyisocyanate 14 that the dispersion 12 will be later mixed with to form the pigmented moisture curing polyurethane paint.

(2) The properties that are desired in the final pigmented moisture curing polyurethane coating 10.

The properties such as flexibility, hardness, chemical resistance, etc. of any moisture curing polyurethane are greatly influenced by the functionality and equivalent weight of the polyisocyanate prepolymer 14 used in making the coating. That is to say that soft and flexible coatings and hard and tough coatings as required for a particular end use can be made by controling the functionality and equivalent weight of the polyisocyanate in its ready to use form.

Functionality: Difunctional polyisocyanates (two isocyanate groups per molecule) generally produce (all else being equal) soft, flexible and rubbery coatings. Polyisocyanates having a functionality of more than two (more than two isocyanate groups per molecule) produce harder and tougher films.

Equivalent Weight: The equivalent weight of the polyisocyanate influences the properties of the final coating. Polyisocyanates having a high equivalent weight produce a less brittle coating than a low equivalent polyisocyanate.

The pigment dispersion 12 comprises from two to 70 percent by weight of pigment and 10 to 90 percent by weight of a first prepolymer reaction product 28 of the organic diisocyanate 22 and the organic polyol 24; said first prepolymer exhibiting an excess of hydroxyl groups. The coating or composition 10 contains from 10 to 90 percent by weight of said pigment dispersion 12 and 10 to 90 percent by weight of the second prepolymer 14 wherein the second prepolymer comprises an excess of isocyanate groups capable of reacting with and consuming all of the hydroxyl groups of the first prepolymer and providing an excess of unreacted isocyanate groups. In addition to the aforesaid, the coating composition 10 contains from 0 to 60 percent by weight a solvent such as Cellosolve Acetate. Preferably, at least there should be 1.01 to 1.2 molar equivalents of the organic polyol 24 per 1.00 molar equivalent of the diisocyanate 22.

I consider it preferable to have an equivalent weight of 500 to 3000 for the first prepolymer reaction product 28 when using the second prepolymer 14, Desmodur N-75. However, the end use properties such as flexibility, durability, chemical resistance, abrasion resistance, etc. dictates the preferable equivalent weight of the composition 10.

The functionality and equivalent weight of any moisture curing polyurethane composition 10 can be controlled by properly choosing either the polyol 24 or the polyisocyanate 14. In other words, a low equivalent weight polyisocyanate 14 can be converted to a high equivalent weight moisture curing polyurethane by partially reacting it with a high equivalent weight difunctional polyol 24, thus achieving increased flexibility. Also, if a difunctional polyisocyanate 14 is used it can be converted into a trifunctional moisture curing polyurethane coating by choosing a trifunctional polyol 24 as its coreactant, thus achieving increased toughness in the final coating.

In my example a trifunctional polyisocyanate 14 has been chosen to partially react with the reaction product 28 to produce a tough general purpose moisture curing polyurethane paint.

The reaction product 28 of the monomeric diisocyanate (IPDI) 22 and the organic polyol 24 (PCP-0210) is a long chain polyol. This long chain polyol 28 will produce a moisture curing polyurethane coating when reacted with the second prepolymer 14, Desmodur N-75.

The choice of the Polyol 24, Monomeric diisocyanate 22 and the Polymeric isocyanate 14 illustrated in my example is one of many combinations that can be used. If a difunctional polyisocyanate 14 is the chosen resin, then slightly branched Polyols can be used in place of the PCP-0210. The choice of the Monomeric diisocyanate 22 is also not limited to IPDI. Any of the commercially available organic diisocyanates as set forth hereinabove will work satisfactorily and their choice is only limited by the properties demanded of the finished coating, said properties being enumerated hereinabove.

It is highly desirable to have the following qualities in moisture curing polyurethane coatings.

(1) Pigmentation for aesthetics, control of gloss, durability, viscosity and corrosion.

(2) Lowest possible monomer content to reduce toxicity.

(3) Lowest possible quantities of solvents for reasons of economy and environment protection.

(4) Formulating latitude so that a variety of products can be made with the ease of relatively few raw materials.

(5) Ease of color matching to reduce production costs.

Polyisocyanates (which are basic raw materials in the manufacture of moisture curing polyurethanes) having very low monomer contents can only be produced by using very sophisticated technology and equipment. Frequently these processes are protected by patents. Desmodur N-75 and Mondur CB-75 are examples of such polyisocyanates. There are several other polyisocyanates 14 commercially available that come under similar classification. It is desirable to manufacture pigmented moisture curing polyurethanes using these preferred polyisocyanates 14. The reasons being (a) they offer the lowest possible monomer contents.

(b) they are of the lowest possible viscosities and hence require less solvent reducing the cost in the final product.

In my invention, I achieve all the highly desirable advantages mentioned hereinabove in the following manner.

The undesirable moisture in the slurry 15 is eliminated by using a calculated excess of the monomeric diisocyanate 22.

The toxic and undesirable, but calculated excess of the momnomeric diisocyanate, is used to advantage to extend a calculated excess of a low equivalent weight polyol 24 into a long chain polyol with a tough urethane backbone with a higher equivalent weight. The diisocyanate and the polyol reacting to form the first prepolymer having an excess of hydroxyl groups.

The dispersion paste 26 offers several of the following benefits:

(a) The reaction product 28 acts as a grinding vehicle for the dispersion of the pigments.

(b) Since the pigments have been dehydrated, they are easy to disperse.

(c) The completed dispersion can be made in many basic colors and stored without adding the polyisocyanates 14. These various colors can be intermixed at a later date to achieve any desired shade of color. When the desired color has been reached the required quantity of the chosen polyisocyanate and solvents (if any) can be mixed into a complete batch. This greatly simplifies the manufacture of different shades of paint.

(d) Since the long chain polyol reaction product 28 will react faster with monomeric isocyanates, than with polyisocyanates, the small quantities of monomeric isocyanates, that is in the polyisocyanate will be partially consumed by the long chain polyol. Thus the monomer content of the polyisocyanate 14 is further reduced.

The isocyanate prepolymers such as Desmodur N-75 and Mondur CB-75 by themselves are totally unsuitable to use as moisture curing polyurethanes as they form very brittle films. The long chain polyol prepared according to my invention, acts as a "bridge" between molecules of the second isocyanate prepolymer 14. The second prepolymer comprises an excess of isocyanate groups that react with and consume all the hydroxyl groups of the first prepolymer.

As previously mentioned formulating latitude is important so that the formulation can use a minimum number of raw materials to obtain a broad range of moisture curing polyurethanes. My invention incorporates the ability to change the quantity of excess monomeric diisocyanate 22 used followed by a corresponding change in the quantity, equivalent weight and functionality of polyol 24 used. The result is that the number and length of "bridges" between the molecules of polyisocyanate 14 are controllable making the composition 10 more or less flexible depending on the nature of change made in the quantity of the excess monomeric diisocyanate 22 used and the corresponding changes in the polyol 24.

The color pigmented dispersion 12 produced as set forth hereinabove and in particular with part 1 of my example may be packaged itself and later combined with the isocyanate prepolymer 14 prior to use or it may be mixed together and sold ready for use without additional mixing. My process, that enables this to be done, as set forth hereinabove, provides for the removal of water from the slurry 15 by means of the monomeric diisocyanate 22; an excess of which is used to ensure complete dehydration of the water formed in the slurry 15. The excess diisocyanate 22 combines with the polyol or hydrogen donor 24 resulting in long chain polyol 28 which then combined with the prepolymer 14 flexiblizes it. The flexiblizing of the prepolymer 14 by means of the color dispersion 12 enables a color pigmented moisture curing polyurethane coating having the desirable properties set forth above to be produced. This was not able to be achieved in the prior art without invoking a great expense and hence, commercially unfeasible. A composition manufactured according to my invention is commercially feasible in that the expensive procedures of the prior art are eliminated.

In conclusion, my invention incorporates in one process the production of a color pigmented dispersion 12 in which the water content has been removed by dehydration caused by the monomeric diisocyanate 22; the elimination of the excess monomeric diisocyanate 22 by the polyol 24 producing a long chain polyol 28 that will combine with the polyisocyanate 14 to form a useful polyurethane coating 10. This enables a reduction in monomer content of the polyisocyanate; it further enables formulating latitude and at the same time reduces the difficulties in manufacturing a stable moisture curing polyurethane in various shades of color. An unstable composition is one in which moisture forms and in turn increases the viscosity of the composition to such a degree that it becomes unusable in a short period of time. This will not occur in a composition produced in accordance with my invention.

It is believed that the invention has been described in such detail as to enable those skilled in the art to understand the same and it will be appreciated that variations may be made without departing from the spirit and scope of the invention.

What is desired to secure by Letters Patent in the United States is:

1. A moisture-curable coating composition which comprises the mixture of a pigment dispersion and a second isocyanate prepolymer, said pigment dispersion comprising from two to 70 percent by weight of pigment and 10 to 90 percent by weight of a first prepolymer reaction product of an organic polyisocyanate and an organic polyol, said first prepolymer exhibiting excess hydroxyl groups, said composition containing from 10 to 90 percent by weight of said pigment dispersion and 10 to 90 percent by weight of said second prepolymer, said second prepolymer comprising an excess of isocyanate groups capable of reacting with and consuming all of said hydroxyl groups on the first prepolymer and providing an excess of unreacted isocyanate groups, said moisture-curable composition containing from 0 to 60 percent by weight of a dispersing solvent.

2. The moisture-curable material of claim 1 in which said second prepolymer is an isocyanate prepolymer and is present in a concentration of 10 to 90 percent by weight.

3. The moisture-curable composition of claim 2 in which said polyisocyanate of the first prepolymer is isophorone diisocyanate and is present in the concentration of at least 5 percent plus the amount needed for dehydration of water from the pigment dispersion.

4. The moisture-curable composition of claim 3 in which said organic polyol ingredient of the first prepolymer is a polycaprolactone polyol and is present in a concentration of 10 to 90 percent by weight.

5. The moisture-curable composition of claim 4 which contains from 0.5 to 3 percent by weight of a non-ionic wetting agent to help suspend the pigments and facilitate dispersion.

6. The moisture-curable composition of claim 5 which contains an effective amount of dibutyl tin dilaurate.

7. The moisture-curable catalyst of claim 6 which contains from 0.1 to 1 percent by weight of a dimethylpolysiloxane fluid to improve flow and slip.

8. The moisture-curable composition of claim 7 in which the majority of said pigment is titanium dioxide.

9. The moisture-curable composition of claim 1 wherein the second prepolymer is biuret of hexamethylene diisocyanate.

10. The moisture-curable composition of claim 1 in which said organic polyol is a diol.

11. The moisture-curable composition of claim 1 in which said organic polyol has a functionality of more than 2.

12. A moisture-curable composition of claim 1 in which said second prepolymer has a functionality of two or more.

13. A method for preparing a color pigmented moisture curing polyurethane composition comprising the steps of combining:

a color pigment dispersion comprising from 2% to 70% by weight of a pigment and a first prepolymer reaction product of an organic diisocyanate and an organic polyol; and a second isocyanate prepolymer from 10% to 90% by weight.

14. A method for preparing a color pigmented moisture curing polyurethane composition as set forth in claim 13 wherein said pigment dispersion comprises two to 70 percent by weight of pigment and 10 to 90 percent by weight of the first prepolymer reaction product, said first prepolymer exhibiting an excess of hydroxyl groups; said composition containing from 10 to 90 percent by weight of said pigment dispersion and 10 to 90 percent by weight of said second prepolymer, said second prepolymer comprising an excess of isocyanate groups capable of reacting with and consuming all of the hydroxyl groups of the first prepolymer and providing an excess of unreacted isocyanate groups; said composition containing from 0 to 60 percent by weight of a dispersing solvent.

15. A method for preparing a color pigmented moisture curing polyurethane composition as set forth in claim 14 wherein said dispersion further comprises solvents and additives mixed with said pigments to form a slurry.

16. A method for preparing a color pigmented moisture curing polyurethane composition of claim 15 wherein said slurry is tested to determine its moisture content.

17. A method for preparing a color pigmented moisture curing polyurethane composition as defined in claim 16 wherein the organic diisocyanate is added in a quantity to dehydrate the moisture content of the slurry.

18. A method for preparing a color pigmented moisture curing polyurethane composition as defined in claim 17 wherein an additional quantity of organic diisocyanate is added to insure complete hydration.

19. A method for preparing a color pigmented moisture curing polyurethane composition as defined in claim 18 wherein the slurry, and the first prepolymer reaction product form a color dispersion paste, comprising a dehydrated slurry and the first prepolymer reaction product.

20. A method for preparing a color pigmented moisture curing polyurethane composition as defined in claim 19 wherein the color dispersion paste is dispersed in a dispersion apparatus forming a color pigmented dispersion.

21. A method for preparing a color pigmented moisture curing polyurethane composition of claim 20 wherein the second prepolymer is biuret of hexamethylene diisocyanate.

22. A method for preparing a color pigmented moisture curing polyurethane composition, said method comprising the steps of combining a color pigment dispersion, and a second prepolymer said dispersion comprising:

| | Percentage by Weight | |
|---|---|---|
| A slurry of: | | |
| Titanium Dioxide pigment | 40.00% | |
| Phthalo Cyanine Blue pigment | 1.33% | |
| Methyl Isobutyl Ketone dispersent - solvent | 21.42% | |
| Silicone Fluid to improve flow and slip | .13% | |
| A non-ionic wetting agent; said pigments, solvents and additives being combined in a jacketed tank; plus | 1.00% | |
| A diisocyante (Isophorone Diisocyanate), (IPDI), agitated with said slurry at between 50° C. and 70° C. until the water is eliminated from the slurry, said elimination of water being confirmed by a Karl-Fischer titration test; plus | 5.20% | + amount needed for dehydration of $H_2O$ from slurry |
| A polycaprolactone polyol, forming a color pigmented paste that is mechanically dispersed, resulting in said color pigmented dispersion; and | 30.67% | |
| | 100.00% | | a second prepolymer.

23. A method for preparing a color pigmented moisture curing polyurethane composition comprising the steps of combining

| | Percentage by Weight |
|---|---|
| The color pigmented dispersion of Claim 22 | 40.00% |
| Biuret of hexamethylene diisocyanate; and | 28.00% |
| Cellosolve Acetate a dispersing solvent | 32.00% |
| | 100.00% |

* * * * *